United States Patent
Jansen et al.

(10) Patent No.: US 7,726,951 B2
(45) Date of Patent: Jun. 1, 2010

(54) FUEL CONTROL MODULE

(75) Inventors: Harvey B. Jansen, Mesa, AZ (US); John F. Calleja, Gilbert, AZ (US); Raymond A. Forrester, Jr., Chandler, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 1063 days.

(21) Appl. No.: 11/156,389

(22) Filed: Jun. 20, 2005

(65) Prior Publication Data

US 2005/0284149 A1    Dec. 29, 2005

Related U.S. Application Data

(60) Provisional application No. 60/581,107, filed on Jun. 18, 2004.

(51) Int. Cl.
*F04B 1/26* (2006.01)
*F04B 27/04* (2006.01)
*F04B 39/02* (2006.01)
*F02G 3/00* (2006.01)

(52) U.S. Cl. .......... 417/270; 417/307; 417/313; 417/366; 417/419; 417/440; 60/39.091; 60/734

(58) Field of Classification Search ........... 417/269, 417/270, 313, 366, 415, 419, 440–442, 307, 417/502; 60/734, 739, 746, 39.821
See application file for complete search history.

(56) References Cited

U.S. PATENT DOCUMENTS

| | | | |
|---|---|---|---|
| 1,229,009 A | 6/1917 | Allison | |
| 2,070,880 A | 2/1937 | Blum | |
| 2,711,073 A * | 6/1955 | Atkinson | 60/39.281 |
| 2,724,239 A * | 11/1955 | Fox | 60/39.281 |
| 3,749,523 A * | 7/1973 | Wahl, Jr. | 417/269 |
| 5,120,201 A * | 6/1992 | Tuckey et al. | 417/366 |
| 5,239,861 A * | 8/1993 | Fujita et al. | 73/61.73 |
| 5,704,274 A | 1/1998 | Forster | |
| 5,918,529 A | 7/1999 | Forster | |
| 5,941,693 A | 8/1999 | Kato | |
| 6,371,740 B1 | 4/2002 | Jansen | |
| 6,484,490 B1 * | 11/2002 | Olsen et al. | 60/39.281 |
| 6,836,086 B1 * | 12/2004 | Goldberg et al. | 318/141 |
| 6,971,373 B2 * | 12/2005 | Mudway et al. | 123/497 |

* cited by examiner

*Primary Examiner*—Charles G Freay
(74) *Attorney, Agent, or Firm*—Quarles & Brady LLP (57) ABSTRACT

A fuel control system is provided in a single compact modular unit. The unit includes a motor driving a highly accurate cam-operated double-acting piston metering pump, both of which are contained in a liquid fuel environment. As the liquid fuel is pumped it works to cool internal components including the motor. An electronic motor drive is contained in a dry chamber of the unit for controlling operation of the motor and pump and is cooled indirectly by the fuel as well. A pressure sensitive flow divider is also included for selectively providing one or multiple output fuel flow paths depending upon whether a pressure threshold is reached, for example to send fuel to primary and secondary burner nozzles. Filter, filter bypass, pressure relief, and fuel shut-off components are also integrated into the single modular unit.

14 Claims, 6 Drawing Sheets

FUEL CONTROL MODULE

CROSS-REFERENCE TO RELATED APPLICATIONS

This application claims benefit to U.S. provisional application Ser. No. 60/581,107 filed Jun. 18, 2004.

STATEMENT OF FEDERALLY SPONSORED RESEARCH OR DEVELOPMENT

Not applicable.

BACKGROUND OF THE INVENTION

1. Technical Field

The present invention relates to fuel control systems for stationary and propulsion gas turbine engines.

2. Description of the Related Art

The high burn rates of gas turbine engines require the fuel delivery systems to be capable of rapidly and precisely metering fuel. Traditionally, fuel delivery systems for turbine engines, particularly those used for jet propulsion, have included a fuel pump, a pressure accumulator and a fuel metering device, all of which are separate components mounted on or near the engine and coupled to the engine and fuel source by suitable fuel lines. The accumulator operates to dampen pulsation or ripple in the fuel caused by the pump so that the metering device can accurately dispense the appropriate amount of fuel to the engine fuel atomizer. The use of multiple components is expensive and occupies space, which is especially limited for propulsion systems.

It is desirable to reduce the number of components in the fuel delivery system by combining the fuel pump and metering device into one unit. However, such combined devices must meet both the extreme pump and the metering requirements for turbine engines. Specifically, it must be able to pump particle contaminated fuel for an extended time period. It must have good dry lift capability and be able to operate with high vapor-to-liquid ratios at the pump inlet. Moreover, if no accumulator or fluid muffler is to be used, the pump must also be able to provide generally non-pulsating fuel flow. It should be exhibit low power consumption and hysteresis and operate with high efficiency and low friction. The device must also have a high turn-down ratio to accurately meter a wide range of flow rates. Additionally, the device must be compact and have minimal internal leakage.

In the turbine industry, the fuel delivery systems typically employ gear pumps which create a pressure differential by moving the fuel through a series of intermeshing teeth running at a high frequency. Gear pumps consume a lot of power and leak internally and are therefore less than ideal for jet engine use. Moreover, due to reliability concerns, gear pumps used for propulsion applications typically are powered by an engine driven gear box (rather than an electric motor) and therefore must be coupled to a separate metering valve via suitable fuel lines, which increases expense and occupies additional space.

U.S. Pat. No. 6,371,740, assigned to the assignee of the present invention and hereby incorporated as though fully set forth herein, discloses a fuel metering pump for turbine engines. The metering pump employs a rotating face cam to alternately reciprocate a pair of actuators that in turn drive a pair of rolling diaphragms to pump and meter the fuel. The metering pump is specially designed to drive the pumping members at a constant velocity to minimize pressure ripple and thus provide essentially non-pulsed metering of the fuel. The rolling diaphragm design assists in keeping contaminants commonly found in jet fuel from degrading the working components of the metering pump.

While the aforesaid metering pump provides a marked improvement in accurate fuel metering at high flow rates, the diaphragms have pressure limitations that can make it less suitable for certain sustained high pressure applications. In particular, it can be necessary in some jet engine applications to achieve a sustained pressure rise of over 500 psi. This pressure must be generated and maintained while metering the high flow rates required for sustained combustion, which can be 700 pph or more.

U.S. application Ser. No. 10/891,269, filed Jul. 14, 2004, assigned to the assignee of the present invention and hereby incorporated as though fully set forth herein, discloses a precision fuel metering pump suited for the aggravated temperature and pressure conditions of turbine engines applications having a unique cam-driven double-ended spool piston arrangement that is very efficient and accurate with little leakage and wide operational parameters. The pump is contained in a compact package, however, a separate DC motor is mounted to the pump housing to drive the piston cam and piston arrangement. Moreover, other components used to control fuel flow must be coupled to this device to achieve proper fuel control, for example, the motor drive control, a fuel shut off valve and a flow divider, which divides flow between the primary outlet port and a secondary outlet port to send fuel to the secondary burner nozzle(s) of the engine after engine light off. These additional components may require their own housings as well as conduit and other fluid and electrical line connections, thus increasing the space and weight requirements of the system. Further, the use of several separate components makes installation and replacement of the control system more time consuming and costly.

Moreover, this pump relies on small, open weave inlet filters to filter debris and contaminants from the fuel prior to entering the pump. Open weave type filters are used to minimize the pressure drop across the inlet, while still providing some filtering, so that the pump will operate at low inlet pressure, near true vapor pressure, without cavitation. However, this comes with somewhat reduced filtering capacity. Excessive debris in the pump can cause binding of the operating member, and reduce its efficiency or lead to pump failure. Thus, filtering of the fuel can be critical to proper performance of the pump and the fuel control system generally.

SUMMARY OF THE INVENTION

The present invention provides an entire fuel control system in a single, compact, yet highly accurate and efficient modular unit. The fuel control module provides high pressure and flow rates of non-pulsed liquid fuel, while exhibiting very low leakage and having excellent dry lift and turn-down capabilities. These attributes and its compact form factor, metering accuracy and high temperature and pressure capabilities make it suitable for fuel delivery to gas turbines, particularly jet engines in aircraft where space and weight restrictions are stringent.

Specifically, one aspect of the present invention provides a fuel control module for controlling the flow of fuel from a fuel supply to a fuel consuming device having at least two consumption components. The fuel control module has a housing containing a drive section, a pump section and a flow divider section. The drive section has a motor and an electronic motor drive. The pump section has an operating member moved by the motor in response to a signal from the motor drive to effect flow of fuel between housing inlet and outlet ports. The flow divider section has a valve for selectively providing fuel flow at the outlet in one or multiple flow paths for communication one or both of the consumption components of the fuel consuming device.

For gas turbine engine applications with multiple combustion zones and burner nozzles, high pressure output fuel flow can initially be sent through a single output port to the primary burner for engine light off. Following ignition and upon reaching a particular threshold pressure, the onboard flow divider can then route output fuel to a second output port to send fuel to the secondary burner(s). Preferably, the flow divider is a pressure operated valve that moves to open the secondary outlet automatically upon reaching the threshold pressure.

In another aspect the invention provides a fuel control module with a drive section, a pump section, a filter section, a flow divider section, and a shut-off section all contained as a single unit in a shared housing. The drive section includes the motor and an electronic motor drive. The pump section includes at least one piston moved by the motor in response to a signal from the motor drive. The flow divider section includes a valve for selectively dividing flow at the outlet. The filter section includes a filter element disposed in communication with the inlet of the housing and the pump section. The shut-off section includes a shut-off valve in communication with the pump section and the outlet of the housing. A pressure relief section can also be contained in the housing which includes a relief valve in communication with downstream (outlet) and upstream (inlet) sides of the pump section.

For efficient operation of the control module fuel contaminants are filtered at the inlet side of the pump. Over time, particularly with heavily contaminated fuel, flow through the filter can be compromised. A filter bypass valve can be provided to route fuel to the pump without first passing through the filter. The filter bypass valve is preferably pressure activated by the force of the fuel acting on an enlarged area downstream side of the valve, which moves the valve against a spring and opens a port leading directly to the pump. Once the pressure subsides, for example, should the filter unclog or be cleaned, the spring will reset the bypass valve to again route the fuel through the filter. Since fuel contaminates can adversely impact the performance and efficiency of the pump, a pressure sensor can be provided to sense pressure downstream from the filter and provide a signal to a system computer or dedicated user interface to provide indication that the filter will need to be cleaned or replaced. Preferably, this user feedback is provided before the bypass valve is activated so that the filter can be attended to before contaminants are passed to the pump.

Yet another aspect of the invention provides a fuel control module with a housing defining interior fluid and dry chambers. The fluid chamber contains the pump and the pump motor, including stator and rotor, and receives fuel through an inlet. The dry chamber is isolated from fuel and contains an electronic motor drive. The drive controls the motor to operate a movable operating member of the pump to move fuel from the inlet through the fluid chamber to an outlet. The pump and motor are thus immersed in fuel such that the pumped fuel cools the motor and other internal components. Preferably, the motor is frameless to allow for better motor cooling.

The pump is preferably a highly accurate metering pump suitable for operation over a pressure range of about 0 to 800 psig in aggravated temperature conditions. Preferably, the pump has at least one operating member in the form of a double-ended spool piston. More preferably, there are two such spool pistons arranged in parallel and operated by a cam arrangement. The pistons can having one or more circumferential pressure balancing grooves to collect debris in the piston chambers and prevent binding of the pistons. This allows the pistons to slide smoothly within the piston chambers with minimal clearances, which in turn provides low internal leakage without the use of piston seals. Residual air space at top dead center is minimized to improve dry lift capability. Also, low pressure drop valves, such as reed valves, and open weave type filters can be used at the inlet to allow for very low inlet pressure, in the range of 2-5 psi above true vapor pressure, without cavitation or the need for a boosted inlet.

These and still other advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

DETAILED DESCRIPTION OF THE PREFERRED EMBODIMENT

The present invention provides a fuel control module ("FCM"), generally referenced in the drawings by number 10, that fits in line between a fuel supply 11 and a fuel consuming device 13, for example which can be a gas turbine engine for power generation or propulsion applications, such as a jet engine or auxiliary power unit therefor consuming standard jet fuel (Jet A, Jet B, JP4 or JP5). In typical applications, the FCM 10 is electrically coupled via a 2-way bus to a remote master computer that controls high level fuel management and other system operations.

The FCM 10 is designed to provide a single device incorporating all of the components for controlling fuel delivery to the engine downstream from the master computer and fuel supply. Installation, as well as serviceability and replacement, of these components is thus simplified. The modular nature of the FCM 10 also allows it to be swapped easily for another unit having different operating parameters should fuel delivery requirements differ or change. Furthermore, the cost, weight and space requirements of separate components and connecting lines therefor are thus avoided.

Referring now to FIGS. 1-4, the FCM 10 is confined to a single housing 12 of a compact form factor capable of fitting within a small space envelope. The housing has an inlet port 14 and primary 16 and secondary 18 outlet ports in communication with an interior fluid chamber 20 through which the fuel passes during operation. The housing 12 is capped at a flanged end by a cover 22 held in place by a clamp collar 24. The other end of the housing 12 has a motor end bell 26 enclosing the fluid chamber 20 and an end cap 28 which defines an interior dry chamber 30. The housing 12 is preferably mounted, to an interior space of the aircraft in a jet engine application, in a vertically down orientation with the end cover 22 downward. The housing 12 has mounting structure 32 and 33 bounding the center of gravity of the FCM 10 to minimize structural distortion caused by vibration, shock and asymmetric loading, which can effect the tight clearances of the pumping components.

Figure 1:
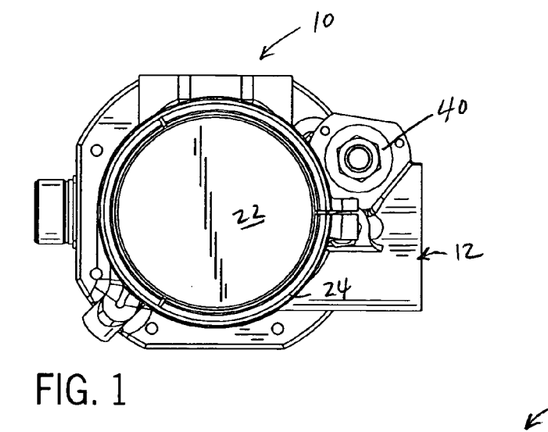
FIG. 1 is an end elevational view of a fuel control module according to the present invention.
Figure 2:
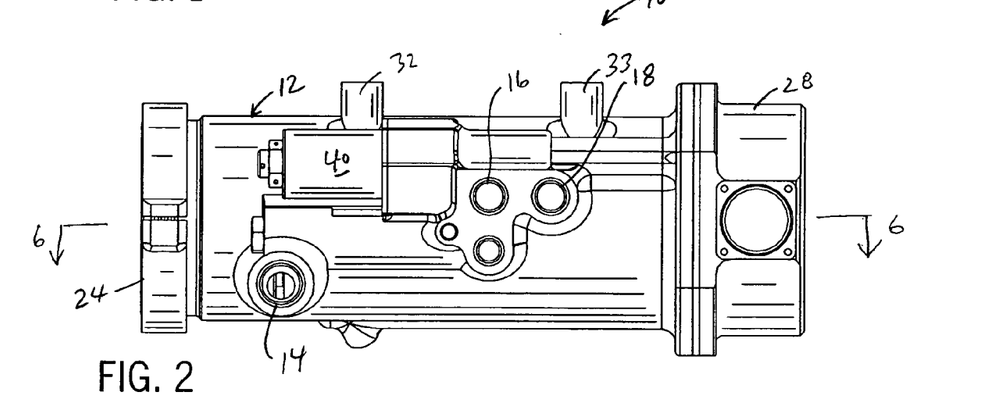
FIG. 2 is a side elevational view thereof.
Figure 3:
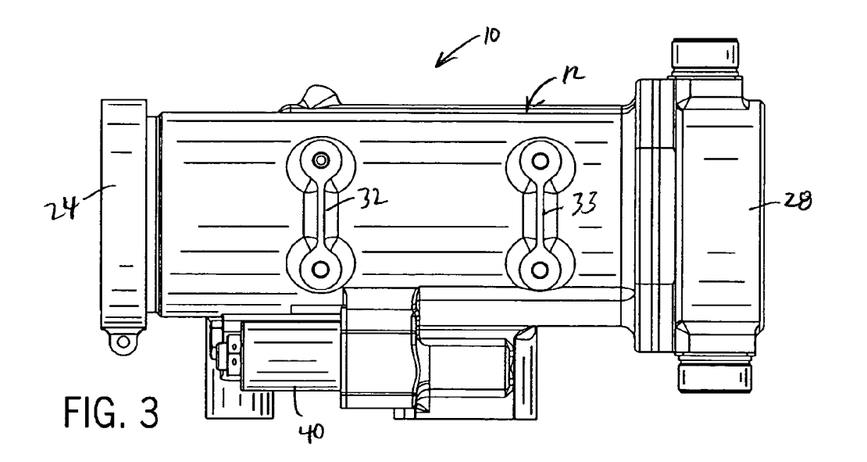
FIG. 3 is a bottom plan view thereof.
Figure 4:
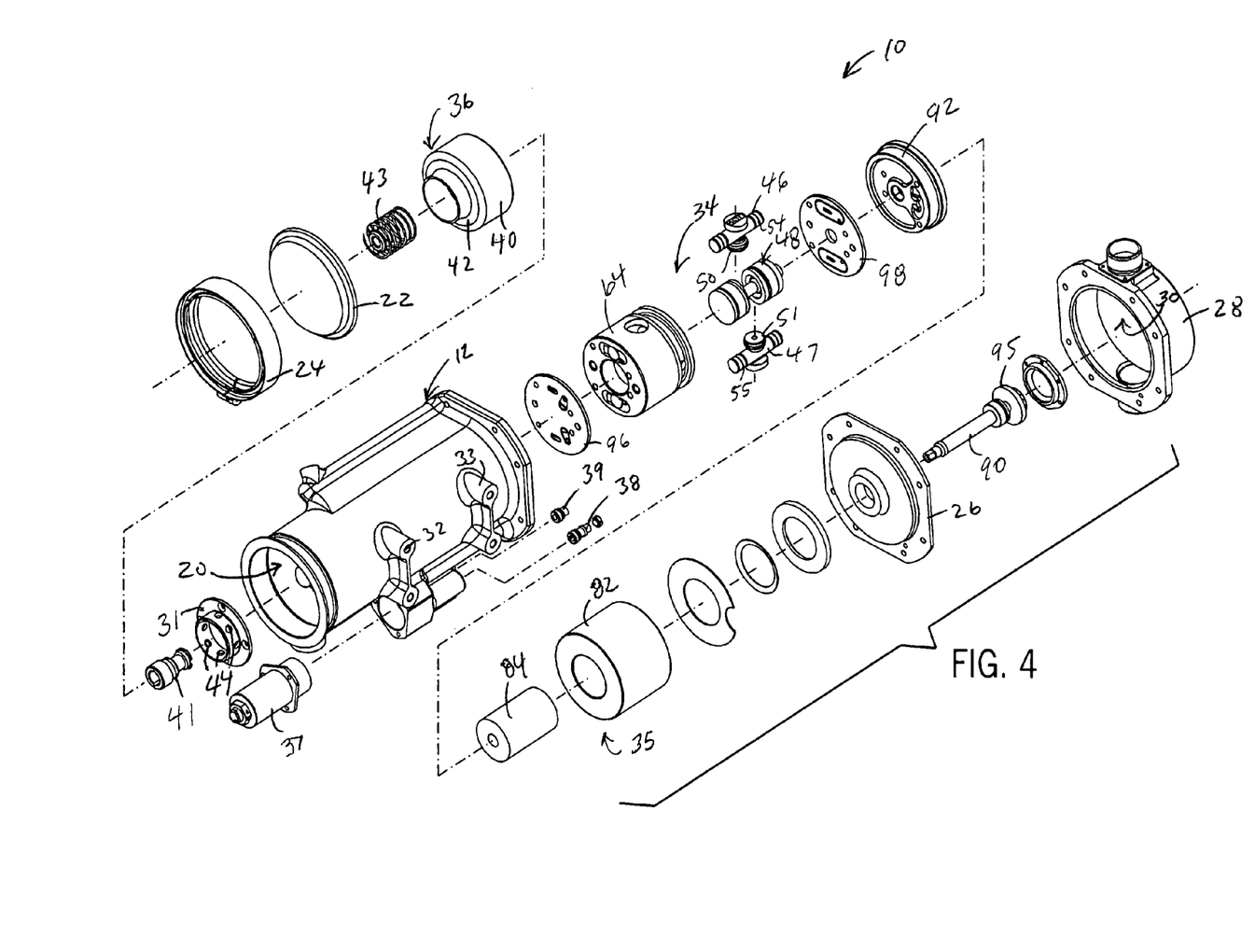
FIG. 4 is an exploded assembly view thereof.
Figure 6:
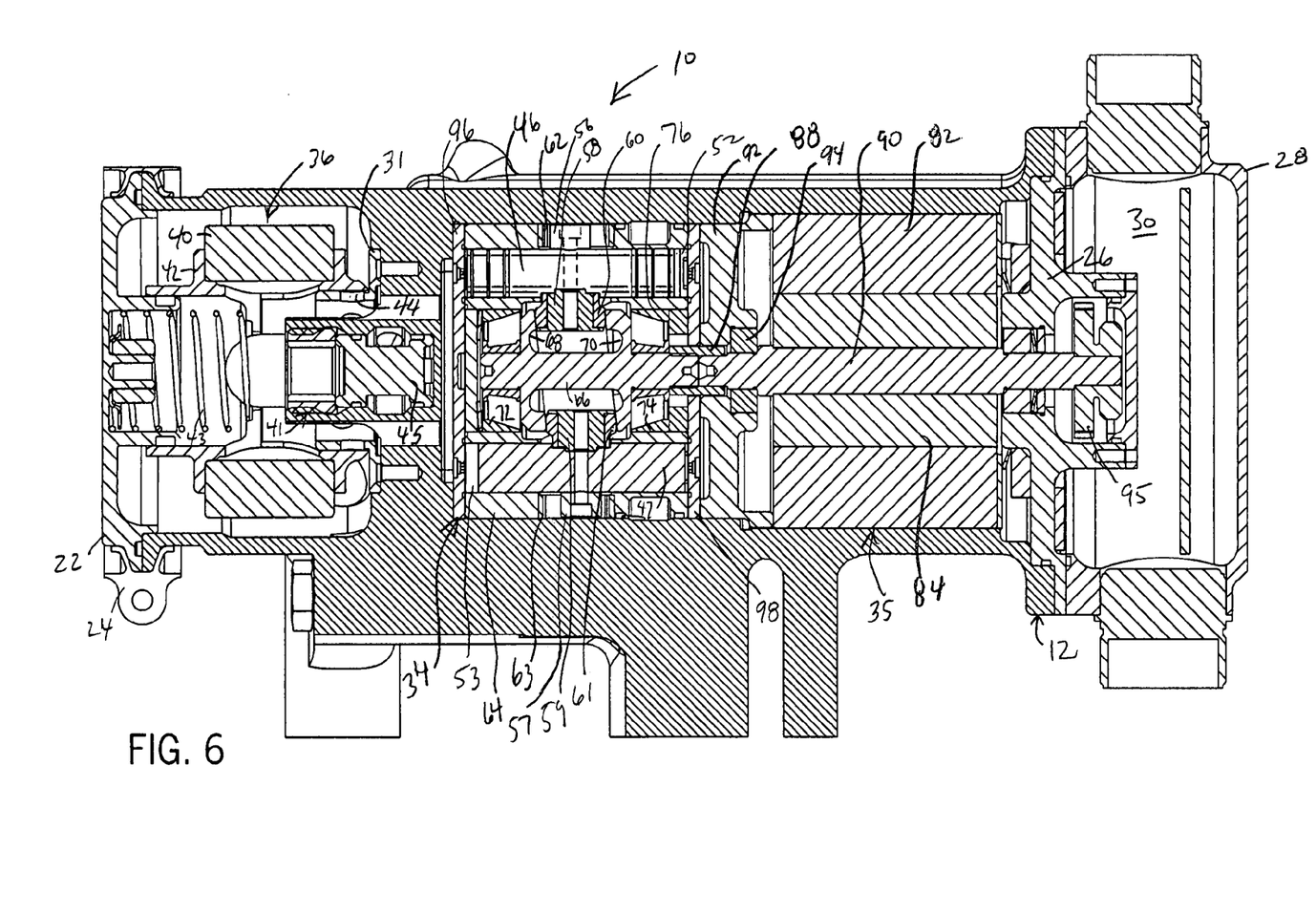
FIG. 6 is a cross-sectional view taken along line 6-6 of FIG. 2, showing the internal components of the fuel control module.
Figure 7:
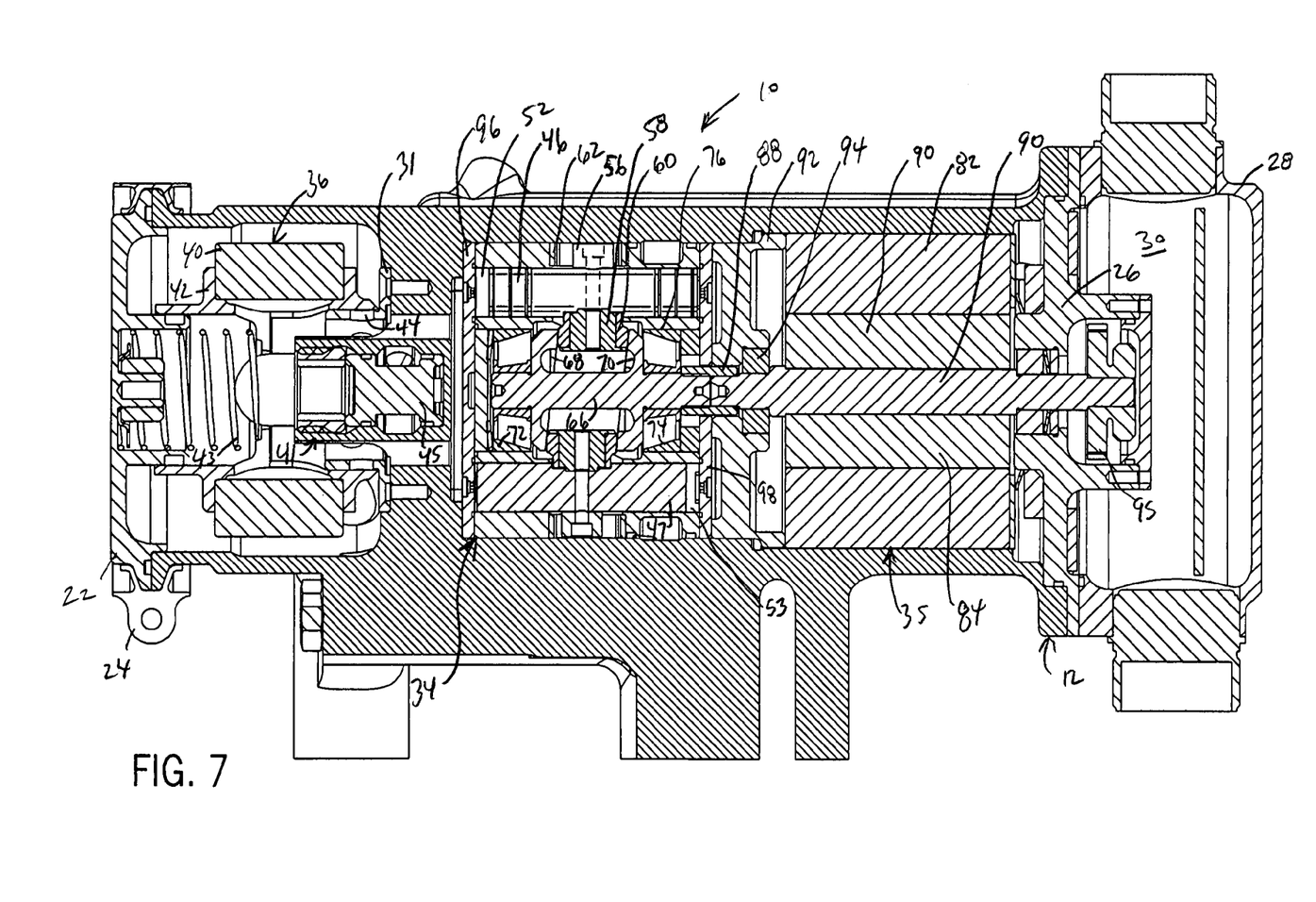
FIG. 7 is a cross-sectional view similar to FIG. 6 albeit showing the pump 180 degrees later in the pump cycle.

As mentioned, and with reference to FIGS. 4, 6 and 7, the housing 12 contains all of the essential components for sending fuel from its source to the engine, including a pump section 34, a drive section 35, a filter section 36, flow shut-off section 37, a flow divider section 38 and a pressure relief section 39. The arrangement of these components is shown schematically at FIG. 8. In particular, from the fuel supply, fuel enters the housing through the inlet port and passes first to the filter section.

The filter section includes a filter element 40, a filter bypass valve 47 and a filter pressure differential sensor 41. The filter element 40 is a toroidal pleated wire mesh, preferably rated 10 μm nominal and 25 μm absolute, providing suitable filtration for at least 50 hours of 500 pph jet fuel flow. The filter element 40 sits in an annular valve member 42 of the bypass valve which is biased by a spring 43 to close off a bypass ports 44 in an annular guide/retainer member 31 that lead directly to the inlet side of the pump section. The bypass valve member 42 has a larger diameter at a downstream end. This asymmetric configuration is used to control operation of the bypass valve. As the filter element 40 collects debris, the pressure drop across the filter will rise. A high pressure drop at the inlet is to be avoided to prevent cavitation and other performance problems with the FCM. When the filter element becomes filled, the fuel pressure acting on the larger surface area (downstream) part of the bypass valve member 42 will force it against the spring 43 so that fuel can flow to the pump section through the bypass ports 44 rather than through the filter element. Because this leaves the pump section subjected to unfiltered fuel, bypass operation is intended to be minimized by using the filter pressure differential sensor 41 located downstream from the filter element. The sensor 41 has a piston member 45 that moves in response to pressure changes and provides a calibrated feedback signal to the master computer or other user interface to indicate the state of the filter element. Thus, for example, a warning light can be energized when the pressure sensor detects a downstream pressure corresponding to a dirty filter. Preferably, this pressure value will be near but less than the crack pressure of the bypass valve so that the filter element can be cleaned or replaced prior to a filter bypass condition occurring.

Fuel is drawn into the pump section 34, which is controlled by the drive section 35, pressurized and passed through the fuel shut off section 37 and the flow divider section 38 downstream from the shut off section. The fuel shut off section includes a normally open solenoid operated valve that can be controlled by the master computer (or onboard circuitry) to positively close off the outlet of the FCM. The flow divider section includes a pressure activated spring loaded piston valve that selectively controls flow to the secondary outlet port 18. The flow divider valve is normally closed so that outlet fuel flows through the primary outlet port 16 so that the FCM initially sends fuel to only the primary burner nozzle of the engine during light off. The flow divider valve opens at a crack pressure reached upon sufficient engine speed so that fuel flows through both the primary 16 and secondary 18 outlet ports and on to the primary and the one or more burner nozzles of the secondary combustion zone(s) of the engine.

Figure 8:
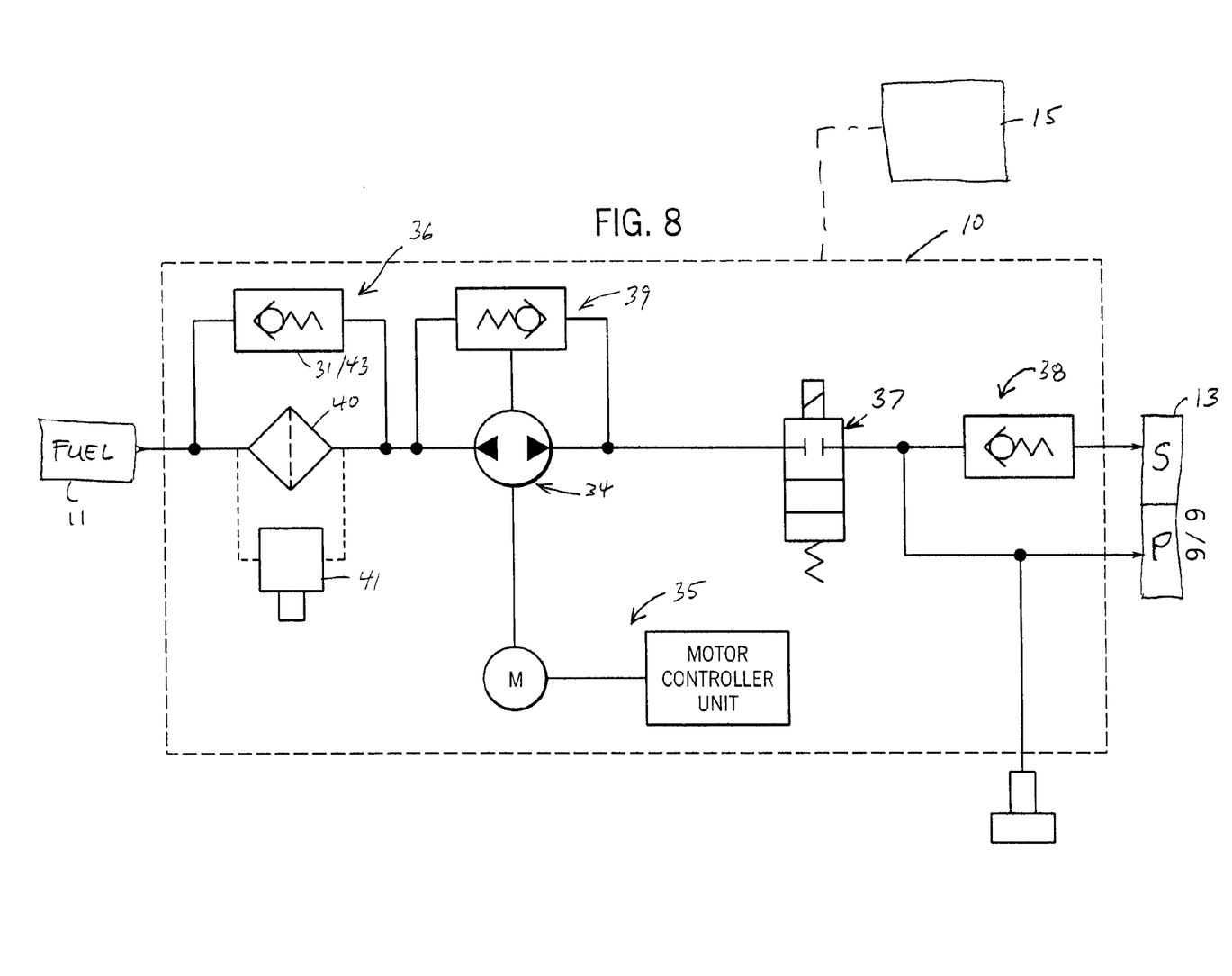
FIG. 8 is a schematic diagram of the fuel control module.

The pressure relief section 39 is provided in return porting between the outlet pressure side of the pump section and its inlet side. The relief section includes a pressure-activated, spring-biased one-way valve that opens in excess pressure conditions to return fuel to the inlet side of the pump.

The heart of the FCM 10 is the highly efficient metering pump 34. The pump 34 is a face cam-actuated, double-acting spool piston pump capable of precisely metering non-pulsating fuel at high pressure and flow rates. The pump flow rate is directly proportional to the command signal and exhibits very low internal leakage such that the pump speed signal can be used by the master computer to accurately calculate fuel burn rate without the need for any ancillary flow measurement device.

Figure 5:
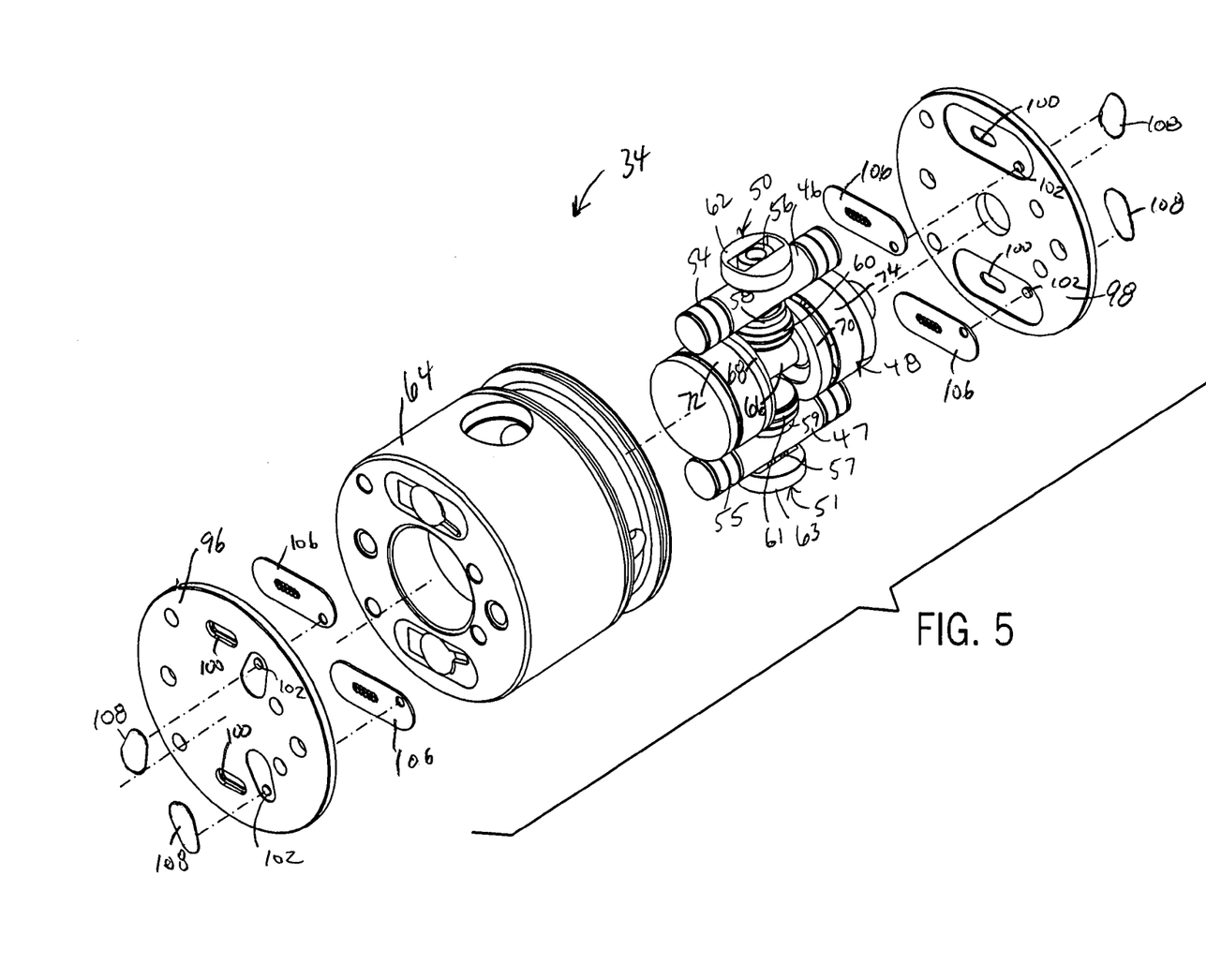
FIG. 5 is an exploded assembly view of a pump section thereof.

The pump includes a pair of pistons 46 and 47, a face cam assembly 48, and a pair of cam follower assemblies 50 and 51. The pistons 46 and 47 are double-acting pistons having flat heads at each end of an elongated cylindrical spool body. The pistons 46 and 47 reciprocate along parallel piston axes within piston chambers 52 and 53. Since the pistons 46 and 47 are double-acting, both ends of the pistons are creating pressure or suction, one end being in a pump stroke while the other is in a suction stroke. The pistons 46 and 47 do not have piston rings or seals because of the high pressure and rapid stroke would generate high friction and in turn wear the rings. Close clearances are thus required to achieve compression and suction. The closer the clearance, the better the pumping action. When no piston rings are present to create a sliding seal, some amount of fuel can leak into the small clearance space around the pistons. If this fuel contains contaminants, the small particles can build up and/or become lodged in the small space between the piston and its chamber. And, since there are no piston rings to center the pistons, the pistons can be moved off of their axes and pushed against the walls of the chambers. This binding can reduce efficiency and even destroy the operation of the pump. To prevent this, the pistons 46 and 47 have a series of spaced apart circumferential grooves 54 and 55, which are preferably slightly larger in width and depth than the clearance of the pistons in the chambers. Small particle contaminants can thus be taken up in the grooves so that they do not interfere with the movement of the pistons. In this way, these grooves act to pressure balance the pistons and allow them to slide along the piston axes without binding.

The pistons 46 and 47 are moved by the cam follower assemblies 50 and 51, which have sliders 56 and 57 that extend through transverse recesses in the pistons 46 and 47. Journals 58 and 59 have outer raceways for rollers 60 and 61 that are rotatably captured between the pistons and end flanges of the journals 58 and 59. Squared ends of the journals 58 and 59 fit into the recesses 50 and 51 in the pistons to prevent their rotation. The sliders 56 and 57 ride within two guides 62 and 63 that fit into openings in an inner pump enclosure 64.

The face cam assembly 48 includes a cam shaft 66 with two integral face cams 68 and 70 that define respective smooth, generally linear ramps, each being a continuous circular surface including a 180 degree incline and a 180 degree decline extending in the axial direction at the same slope and magnitude. The ramps are in opposed facing relation and are spaced axially apart such that the rollers 60 and 61 engage both ramps simultaneously. The face cams 68 and 70 are clocked 180 degrees out of phase so that the beginning of the incline of one ramp is axially aligned with the beginning of the decline of the other ramp. Thus, as the face cams 68 and 70 are rotated, the ramps will maintain the same axial spacing as they revolve through 360 degrees, and thus maintain contact with the rollers 60 and 61. The rollers 60 and 61 will be on opposite parts of the ramps throughout the rotation of the face cams 68 and 70 so that the pistons 46 and 47 will move axially in opposite directions. The face cams 68 and 70 mount respective bearings 72 and 74, which have their outer races pressed into a cam chamber 76 of the pump housing 64 to rotatably support the cam shaft 66. Washers and spacers also mount onto the cam shaft 66 for each bearing. The cam shaft 66 is turned, and thus the pump is driven, by the drive section, which includes a motor, with a stator 82 and a rotor 84, and an electronic motor drive "EMD") 86. A quill shaft 88 is coupled to a motor shaft 90 pressed into the motor rotor 84 and the motor shaft 90 is journalled to a pump cover 92 by a bearing 94.

The motor is preferably a frameless, brushless DC motor capable of operating the pump to create a fuel flow rate of 550 pph and a pressure rise of 450 psid continuous and 800 pph and 680 psid transient. The motor is contained in the fluid chamber of the housing and is thus fully immersed in fuel during operation. This permits the fuel to cool the motor as it is pumped through the FCM. Moreover, it obviates the need for an interstitial drain porting ordinarily present between the pump and motor, thereby improving hermetic sealing of the unit. The EMD is a housed in the dry chamber of the housing with power and other heat producing components preferably being located near the motor end bell so that the fuel can indirectly cool these components as well.

The EMD is a microprocessor based controller electrically coupled over a network bus to the master computer, such as an airframe computer, which provides analog speed input signals to the EMD. The EMD uses high frequency pulse-width modulation of a four quadrant amplifier to precisely control input current to the motor. The EMD holds the angular velocity of the pump constant with minimum ripple in speed during each revolution of the motor using position and speed sensing circuitry to monitor the rotational velocity of the motor via a toothed disk 95 at the end of the motor shaft and three variable reluctance sensors. Motor speed is electronically monitored and compared with the commanded speed from the master computer. A correction can be applied to the motor drive signal to maintain the commanded speed, and a feed forward component consisting of speed and/or torque commands can be added to the motor drive signal to rapidly move the motor to the newly commanded speed with minimal settling time.

The motor rotates the face cam assembly which reciprocates the cam followers and in turn the pistons. The tandem push-push face cam arrangement provides consistent and accurate control of the piston movement, and thus metering of the fuel. Moreover, the dual cams provide a smooth transition between strokes and impart an essentially constant velocity motion to the pistons, at any motor speed, so as to minimize pressure ripple and provide non-pulsating fuel output well suited for high precision turbine applications. The stroke length effected by the face cam arrangement, and the length of the pistons and piston chambers, are selected so that residual air volume at top-dead-center is very small, which enhances dry-lift capability of the metering pump as well as the expulsion of entrained air.

As shown in FIG. 5, valve plates 96 and 98 are disposed at each end of the pump housing 30, each having two sets of sealed inlets 100 and outlets 102 (one set for each end of each of the pistons) controlled by low inertia valves. The inlet ports 100 are recessed in the valve plates to accommodate filters 104 and are controlled by oblong reed valves 106 mounted at the back side of the valve plates. The outlet ports 102 controlled by reed valves 108 mounted at the front of the valve plates. The inlet and outlet ports are arranged, and the pump housing is ported, so that a set of inlet and outlet ports is in communication with each of the piston chambers as well as the inlet 14 and the outlet 16 and 18 ports of the housing.

The valve plate inlet ports, filters and valves are selected to achieve very low pressure drop across the inlets of the valve plates. Specifically, the inlets have a plurality of small orifices, which in addition to making the inlets less susceptible to contamination, help break up the forces from the high speed flow that would otherwise impinge on the inlet valves. Reducing these forces allows thin, low inertia valves to be used, which require less pressure to open. The filters are preferably large capacity, open weave type screen filters. These features allow the metering pump 12 to operate at inlet pressures very near true vapor pressure, preferably 2-5 psi of true vapor pressure, with minimal risk of cavitation without a boosted or pressurized inlet.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

What is claimed is:

1. A fuel control module for controlling the flow of fuel from a fuel supply to a fuel consuming device having at least two consumption components, the fuel control module comprising a housing having an inlet and an outlet, including a first outlet port in communication with a first of the consumption components and a second outlet port in communication with a second of the consumption components, and containing a drive section, a pump section and a flow divider section, the drive section including a motor and an electronic motor drive, the pump section having an operating member moved by the motor in response to a signal from the motor drive to effect flow of fuel between the inlet and the outlet of the housing, the flow divider section having first and second passageways in communication with the respective first and second outlet ports and having a valve controlling fuel flow through the first passageway such that when the valve is closed fuel is directed only to the second outlet port for delivery to the second consumption component and when the valve is open fuel is directed to both the first and second outlet ports for delivery to the respective first and second consumption components, wherein the housing includes a filter section having a filter element disposed in communication with the inlet of the housing and the pump section and a filter bypass valve which opens to allow fuel flow from the inlet to the pump section without passing through the filter element, wherein the filter bypass valve is asymmetric having an enlarged downstream end such that it is pressure activated to open when sufficient pressure acts on the enlarged end.

2. The module of claim 1, wherein the flow divider valve is pressure operated to provide the at least two outlet flow paths when at a pressure higher than a threshold pressure.

3. The module of claim 2, wherein the fuel consuming device is a turbine engine and the first and second consumption components are respective primary and secondary nozzles of the turbine engine.

4. The module of claim 1, further including a pressure sensor sensing pressure downstream from the filter and electrically coupled to a user interface to provide indication of the state of the filter element.

5. The module of claim 1, wherein the housing contains a pressure relief section having a relief valve for controlling return flow from an outlet pressure side of the pump section to an inlet side of the pump section.

6. The module of claim 1, wherein the housing contains a shut-off section having a shut-off valve in communication with the pump section and the outlet of the housing for positively closing off flow through the outlet.

7. The module of claim 1, wherein the operating member of the pump includes at least one cam-operated double-ended spool piston.

8. A fuel control module for controlling the flow of fuel from a fuel supply to a fuel consuming device having first and second consumption components, the fuel control module comprising:
   a housing having an inlet and first and second ports of an outlet and containing a drive section, a pump section, a filter section, a flow divider section, and a shut-off section;
   the drive section including a motor and an electronic motor drive;
   the pump section having a piston moved by the motor in response to a signal from the motor drive to effect flow of fuel between the inlet and the outlet of the housing;
   the filter section having a filter element disposed in communication with the inlet of the housing and the pump section and having a filter bypass valve which opens to allow fuel flow from the inlet to the pump section without passing through the filter element, wherein the filter bypass valve is asymmetric having an enlarged downstream end such that it is pressure activated to open when sufficient pressure acts on the enlarged end;
   the shut-off section having a shut-off valve in communication with the pump section and the outlet of the housing; and
   the flow divider section having first and second passageways in communication with the respective first and second outlet ports and having a valve controlling fuel flow through the first passageway such that when the valve is closed fuel is directed only to the second outlet port for delivery to the second consumption component and when the valve is open fuel is directed to both the first and second outlet ports for delivery to the respective first and second consumption components.

9. A fuel control module for controlling the flow of fuel from a fuel supply to a fuel consuming device having first and second consumption components, the fuel control module comprising:
   a housing defining an interior including a fluid chamber and a dry chamber and having an inlet and an outlet, including first and second outlet ports, in communication with the fluid chamber, the fluid chamber receiving fuel through the inlet and the dry chamber being isolated from fuel;
   an electronic motor drive disposed in the dry chamber;
   a motor having a stator and a rotor both disposed in the fluid chamber;
   a pump having a movable operating member disposed in the fluid chamber and driven by the motor to move fuel from the inlet through the fluid chamber to the outlet; and
   a flow divider defining first and second passageways in communication with the respective first and second outlet ports and having a valve controlling fuel flow through the first passageway such that when the valve is closed fuel is directed only to the second outlet port for delivery to the second consumption component and when the valve is open fuel is directed to both the first and second outlet ports for delivery to the respective first and second consumption components;
   a filter assembly having a filter element disposed in communication with the inlet of the housing and the pump and having a filter bypass valve which opens to allow fuel flow from the inlet to the pump without passing through the filter element, wherein the filter bypass valve is asymmetric having an enlarged downstream end such that it is pressure activated to open when sufficient pressure acts on the enlarged end.

10. The module of claim 9, wherein the flow divider valve is pressure operated to open when at a pressure higher than a threshold pressure.

11. The module of claim 9, further including a pressure relief section having a relief valve for controlling return flow from an outlet pressure side of the pump to an inlet side of the pump.

12. The module of claim 9, further including a shut-off section having a shut-off valve in communication with the pump and the outlet of the housing for positively closing off flow through the outlet.

13. The module of claim 9, wherein the operating member of the pump is at least one cam-operated double-ended spool piston.

14. The module of claim 13, wherein the piston has one or more circumferential pressure balancing grooves.

* * * * *